US012626069B2

(12) United States Patent
Iyer et al.

(10) Patent No.: US 12,626,069 B2
(45) Date of Patent: May 12, 2026

(54) IMAGE DESCRIPTION GENERATION WITH VARYING LEVELS OF DETAIL

(71) Applicant: ADOBE INC., San Jose, CA (US)

(72) Inventors: Akshay Ganesh Iyer, Thane (IN);
Nikunj Goyal, Haridwar (IN); Kanad Shrikar Pardeshi, Mumbai (IN);
Pranamya Prashant Kulkarni,
Belapur Navi Mumbai (IN); Abhilasha Sancheti, College Park, MD (US);
Praneetha Vaddamanu, Pennsylvania,
PA (US); Aparna Garimella,
Hyderabad (IN); Apoorv Umang Saxena, Karnataka (IN); Vishwa Vinay,
Bangalore (IN)

(73) Assignee: ADOBE INC., San Jose, CA (US)

( * ) Notice: Subject to any disclaimer, the term of this patent is extended or adjusted under 35 U.S.C. 154(b) by 301 days.

(21) Appl. No.: 18/355,573

(22) Filed: Jul. 20, 2023

(65) Prior Publication Data

US 2025/0028911 A1     Jan. 23, 2025

(51) Int. Cl.
*G06F 40/40*        (2020.01)
*G06V 10/22*        (2022.01)
*G06V 10/44*        (2022.01)
*G06V 10/764*       (2022.01)
*G06V 10/774*       (2022.01)
*G06V 10/82*        (2022.01)

(52) U.S. Cl.
CPC ............ *G06F 40/40* (2020.01); *G06V 10/225*
(2022.01); *G06V 10/44* (2022.01); *G06V 10/764* (2022.01); *G06V 10/774* (2022.01);
*G06V 10/82* (2022.01)

(58) Field of Classification Search
CPC ........ G06F 40/40; G06V 10/82; G06V 10/44;
G06V 10/774; G06V 10/764; G06V 10/225

See application file for complete search history.

(56) References Cited

U.S. PATENT DOCUMENTS

| | | | | |
|---|---|---|---|---|
| 10,999,566 B1 * | 5/2021 | Mahyar | ................. | G06F 40/166 |
| 2021/0201044 A1 * | 7/2021 | Herdade | ................. | G06T 11/20 |
| 2022/0414869 A1 * | 12/2022 | Butler | ........................ | G06T 7/11 |
| 2024/0203085 A1 * | 6/2024 | Bangalath | ............. | G06T 1/0021 |

(Continued)

OTHER PUBLICATIONS

Alberti, et al, "Fusion of Detected Objects in Text for Visual Question Answering", arXiv preprint: arXiv:1908.05054v2 [cs.CL] Nov. 3, 2019, 10 pages.

(Continued)

*Primary Examiner* — Lixi C Simpson
(74) *Attorney, Agent, or Firm* — F. CHAU & ASSOCIATES, LLC

(57) ABSTRACT

One or more aspects of the method, apparatus, and non-transitory computer readable medium include obtaining an image and a detail level, wherein the detail level comprises a value indicating a level of detail for a description of the image. One or more aspects of the method, apparatus, and non-transitory computer readable medium further include identifying a set of regions for the image based on the detail level using a machine learning model, and generating a description for the image based on the set of regions, wherein an amount of detail in the description is based on the detail level.

20 Claims, 11 Drawing Sheets

(56) References Cited

U.S. PATENT DOCUMENTS

2025/0131753 A1*    4/2025   Fan ..................... G06V 10/771

OTHER PUBLICATIONS

Anderson, et al, "Bottom-Up and Top-Down Attention for Image Captioning and Visual Question Answering", arXiv preprint: arXiv:1707.07998v3 [cs.CV] Mar. 14, 2018, 15 pages.

Cho, et al, "Fine-grained Image Captioning with Clip Reward", arXiv preprint: arXiv:2205.13115v2 [cs.CL] Mar. 29, 2023, 11 pages.

Cornia, et al, "Meshed-Memory Transformer for Image Captioning", arXiv preprint: arXiv:1912.08226v2 [cs.CV] Mar. 20, 2020, 15 pages.

Deng, et al, "Length-Controllable Image Captioning", arXiv preprint: arXiv:2007.09580v1 [cs.CV] Jul. 19, 2020, 18 pages.

Devlin, et al, "Bert: Pre-training of Deep Bidirectional Transformers for Language Understanding", arXiv preprint arXiv:1810.04805v2 [cs.CL] May 24, 2019, 16 pages.

Everingham, et al, "The Pascal Visual Object Classes (VOC) Challenge", International Journal of Computer Vision manuscript No., At: https://www.bibsonomy.org/bibtex/2af3e05b5f98957bd59f03f37fad407c5/tgandor, 2012, 34 pages.

Farabet, et al., "Learning Hierarchical Features for Scene Labeling", (Author manuscript), IEEE Transactions on Pattern Analysis and Machine Intelligence, Aug. 2013, 16 pages.

Fisch, et al., "CAPWAP: Captioning with a Purpose", arXiv preprint: arXiv:2011.04264v1 [cs.CL] Nov. 9, 2020, 14 pages.

Girshick, "Fast R-CNN", arXiv preprint: arXiv:1504.08083v2 [cs.CV] Sep. 27, 2015, 9 pages.

Girshick, et al, "Rich feature hierarchies for accurate object detection and semantic segmentation", Tech report (v5), arXiv preprint: arXiv:1311.2524v5 [cs.CV] Oct. 22, 2014, 21 pages.

Gu, "Recognition Using Regions", UC Berkley Electronic Theses and Dissertations, At: https://escholarship.org/uc/item/0kt4j383, 2012, 84 pages.

He, et al, "Deep Residual Learning for Image Recognition", arXiv preprint: arXiv:1512.03385v1 [cs.CV] Dec. 10, 2015, 12 pages.

Hochreiter, et al, "Long Short-Term Memory", Neural Computation, 9 (8), pp. 1735-1780, 1997, 32 pages.

Johnson, et al, "DenseCap: Fully Convolutional Localization Networks for Dense Captioning", arXiv preprint: arXiv:1511.07571v1 [cs.CV] Nov. 24, 2015, 10 pages.

Karpathy et al, "Deep Fragment Embeddings for Bidirectional Image Sentence Mapping", arXiv preprint: arXiv:1406.5679v1 [cs.CV] Jun. 22, 2014, 9 pages.

Krause, et al, "A Hierarchical Approach for Generating Descriptive Image Paragraphs", arXiv preprint: arXiv:1611.06607v2 [cs.CV] Apr. 10, 2017, 9 pages.

Ren, et al., "Faster R-CNN: Towards Real-Time Object Detection with Region Proposal Networks", arXiv preprint: arXiv:1506.01497v3 [cs.CV] Jan. 6, 2016, 14 pages.

Simonyan, et al. "Very Deep Convolutional Networks for Large-Scale Image Recognition", arXiv preprint: arXiv:1409.1556v6 [cs.CV] Apr. 10, 2015, 14 pages.

Vaswani, et al, "Attention Is All You Need", arXiv preprint: arXiv:1706.03762v5 [cs.CL] Dec. 6, 2017, 15 pages.

Wang, et al, "OFA: Unifying Architectures, Tasks, And Modalities Through a Simple Sequence-To-Sequence Learning Framework", arXiv preprint: arXiv:2202.03052v2 [cs.CV] Jun. 1, 2022, 26 pages.

Zhou, et al, "Unified Vision-Language Pre-Training for Image Captioning and VQA", arXiv preprint: arXiv:1909.11059v3 [cs.CV] Dec. 4, 2019, 10 pages.

* cited by examiner

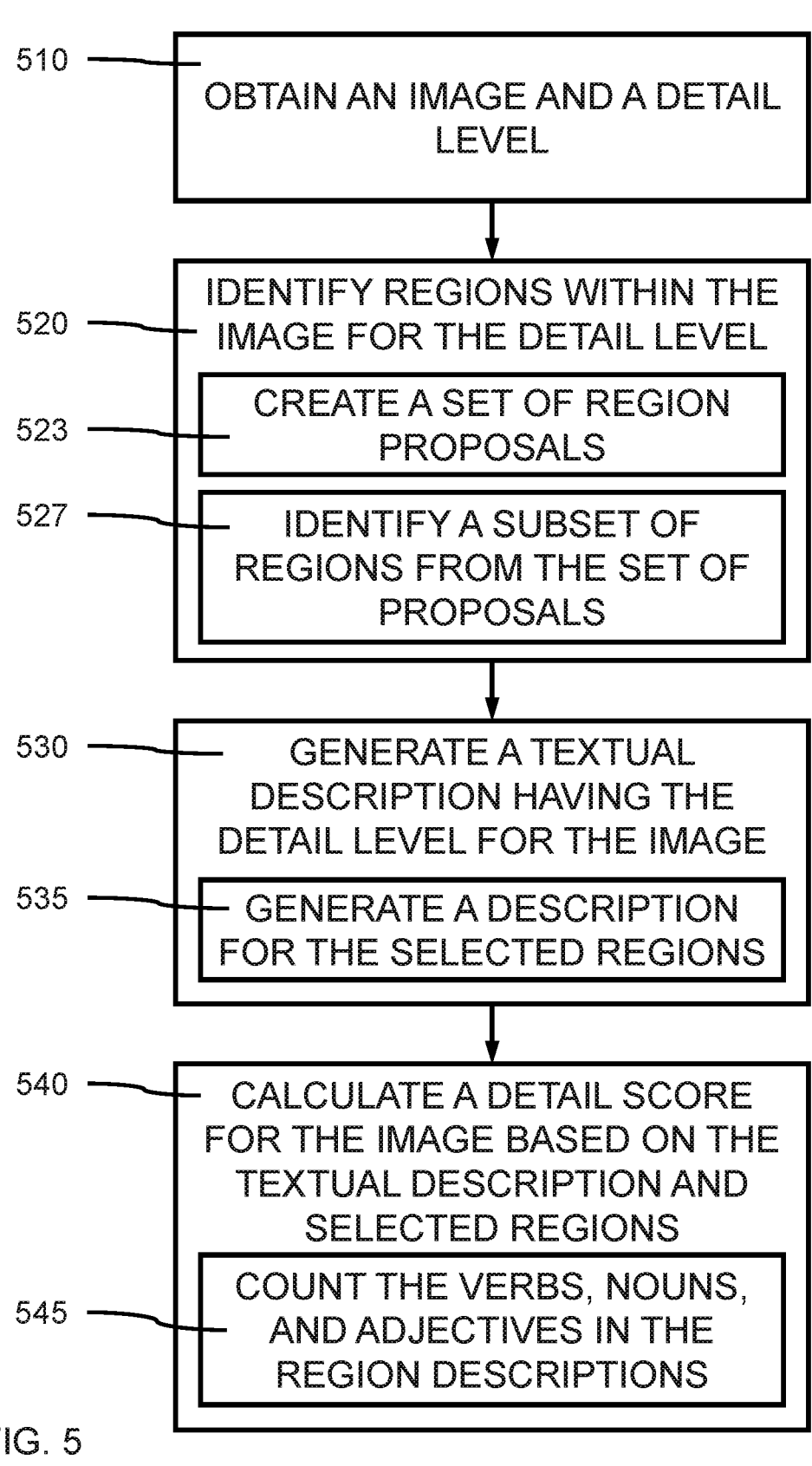

510 OBTAIN AN IMAGE AND A DETAIL LEVEL

520 IDENTIFY REGIONS WITHIN THE IMAGE FOR THE DETAIL LEVEL

523 CREATE A SET OF REGION PROPOSALS

527 IDENTIFY A SUBSET OF REGIONS FROM THE SET OF PROPOSALS

530 GENERATE A TEXTUAL DESCRIPTION HAVING THE DETAIL LEVEL FOR THE IMAGE

535 GENERATE A DESCRIPTION FOR THE SELECTED REGIONS

540 CALCULATE A DETAIL SCORE FOR THE IMAGE BASED ON THE TEXTUAL DESCRIPTION AND SELECTED REGIONS

545 COUNT THE VERBS, NOUNS, AND ADJECTIVES IN THE REGION DESCRIPTIONS

FIG. 5

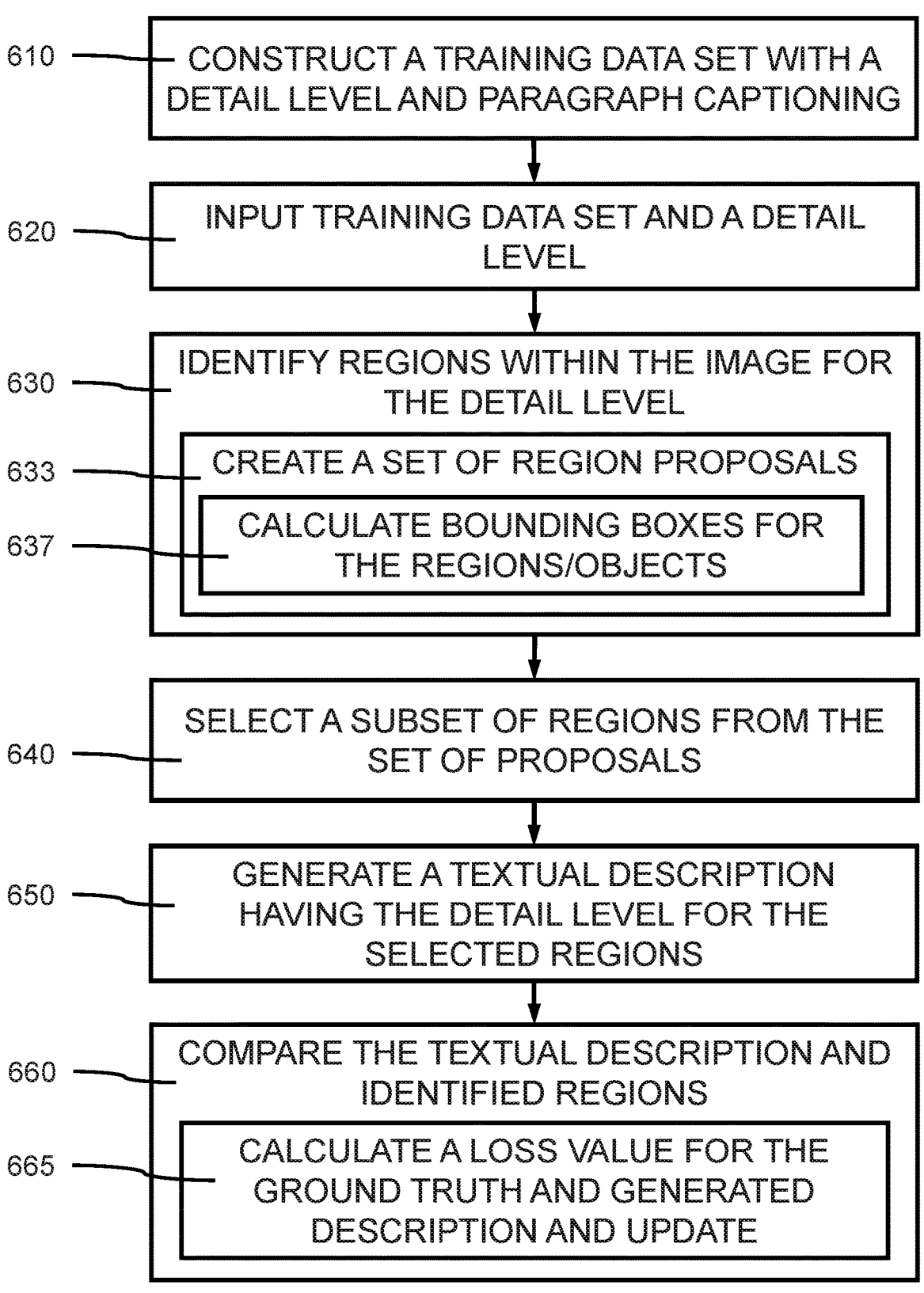

610 — CONSTRUCT A TRAINING DATA SET WITH A DETAIL LEVEL AND PARAGRAPH CAPTIONING

620 — INPUT TRAINING DATA SET AND A DETAIL LEVEL

630 — IDENTIFY REGIONS WITHIN THE IMAGE FOR THE DETAIL LEVEL

633 — CREATE A SET OF REGION PROPOSALS

637 — CALCULATE BOUNDING BOXES FOR THE REGIONS/OBJECTS

640 — SELECT A SUBSET OF REGIONS FROM THE SET OF PROPOSALS

650 — GENERATE A TEXTUAL DESCRIPTION HAVING THE DETAIL LEVEL FOR THE SELECTED REGIONS

660 — COMPARE THE TEXTUAL DESCRIPTION AND IDENTIFIED REGIONS

665 — CALCULATE A LOSS VALUE FOR THE GROUND TRUTH AND GENERATED DESCRIPTION AND UPDATE

FIG. 6

710 — OBTAIN AN IMAGE AND A DETAIL LEVEL

720 — IDENTIFY A SET OF REGIONS FOR THE IMAGE BASED ON THE DETAIL LEVEL

730 — GENERATE A DESCRIPTION FOR THE IMAGE BASED ON THE SET OF REGIONS

810 — OBTAIN A TRAINING DATA SET INCLUDING A REGION OF AN IMAGE, A DETAIL LEVEL, AND A GROUND TRUTH CLASSIFICATION OF THE REGION

820 — CLASSIFY THE REGION BASED ON THE DETAIL LEVEL TO OBTAIN A PREDICTED REGION CLASSIFICATION

830 — TRAIN THE CLASSIFIER TO CLASSIFY IMAGE REGIONS BASED ON THE PREDICTED REGION CLASSIFICATION AND GROUND TRUTH CLASSIFICATION

910 — OBTAIN A TRAINING DATA SET INCLUDING A REGION OF AN IMAGE, A DETAIL LEVEL, AND A GROUND TRUTH DESCRIPTION

920 — PREDICT A DESCRIPTION FOR A REGION OF AN IMAGE

930 — TRAIN THE DESCRIPTION GENERATION NETWORK TO GENERATE DESCRIPTIONS BASED ON THE PREDICTED DESCRIPTION AND GROUND TRUTH DESCRIPTION

115

1030

1010

1020

IMAGE DESCRIPTION GENERATION WITH VARYING LEVELS OF DETAIL

BACKGROUND

The present disclosure relates to generating descriptions having varying levels of detail for an image in response to a user prompt.

Images can depict various objects and actions in a scene that can be included in an informative description, such that images and sentences can be associated. With image captioning, classifying an image from a fixed set of categories based on an object has expanded to labeling an image with a sequence of words able to express richer concepts. Dense captioning involves using a model to predict a set of descriptions across regions of an image.

SUMMARY

Embodiments of the present disclosure provide a machine learning model including a generative network trained to generate a text description for an image, where the description can include a varying amount of detail based on a detail level. The detail level can be provided by a user. A description generator can construct different detail level descriptions for a given image based on detected objects and activities occurring in the image.

A method, apparatus, and non-transitory computer readable medium for a method of training a machine learning model are described. One or more aspects of the method, apparatus, and non-transitory computer readable medium include obtaining an image and a detail level, wherein the detail level comprises a value indicating a level of detail for a description of the image, identifying a set of regions for the image based on the detail level using a machine learning model, and generating a description for the image based on the set of regions, wherein an amount of detail in the description is based on the detail level.

A method, apparatus, and non-transitory computer readable medium for a method of training a machine learning model are described. One or more aspects of the method, apparatus, and non-transitory computer readable medium include obtaining a training data set including a region of an image, a detail level, and a ground truth classification of the region, classifying the region of the image based on the detail level using a classifier of the machine learning model to obtain a region classification, and training the classifier to classify image regions based on the region classification and the ground truth classification.

A method, apparatus, and non-transitory computer readable medium for a method of training a machine learning model are described. One or more aspects of the method, apparatus, and non-transitory computer readable medium include one or more processors, one or more memories including instructions executable by the one or more processors, and a machine learning model including parameters stored in the one or more memories, wherein the machine learning model is trained to identify a set of regions for an image based on a detail level and to generate a description for the image based on the set of regions.

A method, apparatus, and non-transitory computer readable medium for training a description generation network is described. One or more aspects of the method, apparatus, and non-transitory computer readable medium include a training data set including a description paragraph having multiple sentences as ground truth descriptions of image features.

BRIEF DESCRIPTION OF THE DRAWINGS

FIG. 5 shows a diagram illustrating an example of a method of generating a text description at a level of detail for an image, according to aspects of the present disclosure.

FIG. 6 shows a diagram of an example of a method of training a description generator, according to aspects of the present disclosure.

DETAILED DESCRIPTION

Figure 1:
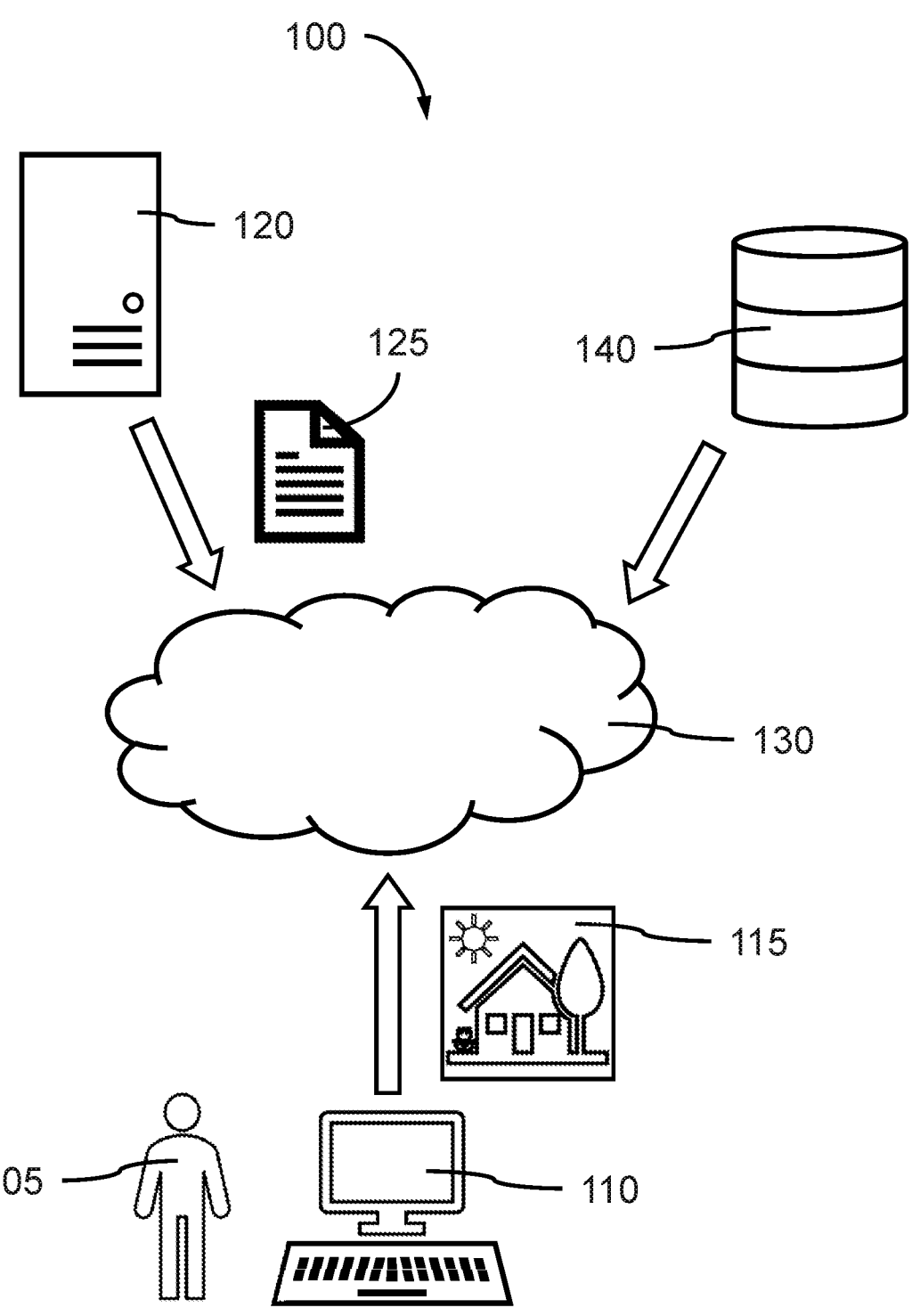
FIG. 1 is an illustrative depiction of a high-level diagram of a user interacting with a description generation system, including a neural network for generating image descriptions, according to aspects of the present disclosure.

The present disclosure relates to generating a text description for an image, where the length and specificity of the description can be adjusted based on a user's requested level of detail. Being able to generate an image caption with a user-determined level of detail can provide greater flexibility and usefulness compared to a caption generated with a fixed level of detail determined by a network's initial training.

In various embodiments, a region convolutional neural network (R-CNN) can identify objects in an image using bounding boxes, where the identified objects may be ranked and selected based on a determined level of importance. The RCNN can be a Faster RCNN (F-RCNN), where a region proposal network (RPN) can be part of the F-RCNN.

In various embodiments, a detection network can predict the final bounding box offsets, where the detection network is a part of the region proposal network. A description may be generated for the selected one or more objects using a language model, for example, a Bidirectional Encoder Representations from Transformers (BERT) model or Long-Short Term Memory (LSTM) network. The BERT model or LSTM model can generate each token in the description one at time by selecting the most likely next token given the previously generated tokens and the image region feature.

The generated descriptions can be refined by removing sentences that are similar/redundant to other sentences in the description.

In various embodiments, a method to generate descriptions with a user identified level of detail is provided. The description generation can involve an image network to identify features in an image, and a large language network to generate sentences that convey information about the identified features. Given an input image and a level of detail, a description generator can output a text description of varying length and detail, where the length can be based on the number of sentences included in the description.

In various embodiments, the network architecture can be trained and used to generate a description providing a level of detail specified by a user. A machine learning model can be utilized to learn to determine what features in an image to describe and the amount of specificity and complexity to include about each feature in relation to the level of detail. The R-CNN can be a pre-trained network that can identify a plurality of objects in an image and determine a bounding box for each of the identified objects. A classifier model can select a subset of the identified objects for description. A language model can take the subset of identified objects and generate a description, where the language model can learn the extent of a description to be generated.

A method, apparatus, and non-transitory computer readable medium for generating descriptions at varying levels of detail are described. One or more aspects of the method, apparatus, and non-transitory computer readable medium include an image analysis component and a description generation network to identify features in an image and provide text describing one or more of the features.

Accordingly, embodiments of the disclosure improve on the quality and amount of detail provided for an image description based on a detail level, this allows for image descriptions having more or fewer objects and details included in a text description in response to a user's preference. The model can be trained to generate an image description with different levels of detail to meet different user demands and uses.

Network Architecture

One or more aspects of the apparatus and method include one or more processors; a memory coupled to and in communication with the one or more processors, wherein the memory includes instructions executable by the one or more processors to perform operations including identifying a set of regions of interest in an image, that may contain objects to be in included in a caption, utilizing a region proposal network that can be an image encoder. The instructions executable by the one or more processors to perform operations further including selecting, using a binary classifier, a subset of region proposals to be described for a given detail level for the image, where the region proposals are represented by bounding boxes. The instructions executable by the one or more processors to perform operations further including generating the descriptions for the selected bounding boxes using a description generation network.

In various embodiments, a pipeline-based approach can be used to generate detail-guided textual descriptions for images, which takes in an image and a detail level value (e.g., an integer in a predetermined range) as input, and outputs a textual description that describes the given image, while also capturing the given detail level. A neural network architecture, including encoders, transformers, deep neural networks (DNNs), recurrent neural networks (RNNs), and convolutional neural networks (CNNs), can be used to analyze the image and generate the textual description(s). An encoder or convolutional neural network (CNN) can be used to extract global image features, and a transformer or recurrent neural network (RNN) can be used to decode the features into sentences.

In the context of an image description, increasing detail can corresponds to an increasing focus on a greater number of objects in an image, and on a greater number of attributes for each of the objects, as well as elaborating on the action(s) of the object(s) in the image. A low detail level could correspond to a short description of a main object and/or event at a higher level of abstraction (e.g., a lesser amount of specificity and complexity), whereas a high detail level could correspond to a longer description relating to multiple objects and actions at a lower level of abstraction (e.g., a greater amount of specificity and complexity).

In one or more embodiments, a fast R-CNN network can be implemented to identify a set of region proposals for image regions that may contain objects of interest, and a description generator network can generate a description for each selected region proposal.

FIG. 1 is an illustrative depiction of a high-level diagram of a user interacting with a description generation system, including a neural network for generating image descriptions, according to aspects of the present disclosure.

In various embodiments, a description generation system 100 can involve a user 105 who can interact with description generating software on a user device 110. The user device 110 can communicate with a description generation apparatus 120, which can be a server located on the cloud 130. The description generation apparatus 120 can generate a description 125 at a user-defined detail level for an image 115 that can be appended to the image 115 as a caption. Image captioning aims to automatically generate such natural language captions for an image.

In various embodiments, description generation apparatus 120 can include a computer implemented network having a user interface, a machine learning model, which can include a natural language processing (NLP) model and image encoder model. The description generation apparatus 120 can also include a processor unit, a memory unit, a transformer/encoder, and a training component. The training component can be used to train one or more machine learning models. Additionally, description generation apparatus 120 can communicate with a database 140 via cloud 130. In some cases, the architecture of the neural network is also referred to as a network or a network model. The neural network model can be trained to automatically generate a description 125 having a user specified detail level based on an image.

Embodiments of the disclosure can be implemented in a server operating from the cloud 130, where the cloud 130 is a computer network configured to provide on-demand availability of computer system resources, such as data storage and computing power. In some examples, the cloud 130 provides resources without active management by the user 105. The term cloud is sometimes used to describe data centers available to many users over the Internet. Some large cloud networks have functions distributed over multiple locations from central servers. A server is designated an edge server if the server has a direct or close connection to a user. In some cases, a cloud 130 is limited to a single organization. In other examples, the cloud 130 is available to many organizations. In an example, a cloud 130 includes a multi-layer communications network comprising multiple edge routers and core routers. In another example, a cloud 130 is based on a local collection of switches in a single physical location.

In various embodiments, the functions of the description generation apparatus 120 can be located on or performed by the user device 110. Images and other resources for obtaining or editing the image 115 can be stored on a database 140. User device 110 may be a personal computer, laptop computer, mainframe computer, palmtop computer, personal assistant, smart phone, tablet, mobile device, or any other suitable processing apparatus. In some non-limiting examples, user device 110 includes software that incorporates a description generation application. In some examples, the description generation application on user device 110 may include functions of description generation apparatus 120.

In various embodiments, a user interface may enable user 105 to interact with user device 110. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

In various embodiments, a description generation apparatus 120 can include a computer implemented network comprising a user interface, a machine learning model, which can include a convolutional neural network model and a transformer model. Description generation apparatus 120 can also include a processor unit, a memory unit, an image encoder, a region proposal network, a classifier network, a description generating network, and a training component. The training component can be used to train the machine learning model. Additionally, description generation apparatus 120 can communicate with database 140 via cloud 130. In some cases, the architecture of the description generation network is also referred to as a network model. The description generation network can be trained to generate an image description 125 using a natural language model. Further detail regarding the architecture of description generation apparatus 120 is provided for example with reference to FIGS. 3, 4, and 11. Further detail regarding the operation of description generation apparatus 120 is provided, for example, with reference to FIGS. 2 and 5-9.

In various embodiments, description generation apparatus 120 is implemented on a server. A server provides one or more functions to users linked by way of one or more networks (e.g., local area network (LAN), wide area network (WAN), Internet). In some cases, the server can include a single microprocessor board, which includes a microprocessor responsible for controlling aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 130 can be a computer network configured to provide on-demand availability of computer system resources, such as data storage and computing power. In some examples, cloud 130 provides resources without active management by user 105. The term "cloud" is sometimes used to describe data centers available to many users (e.g., user 105) over the Internet. Some large cloud networks have functions distributed over multiple locations from central servers. A server is designated an edge server if the server has a direct or close connection to a user (e.g., user 105). In some cases, cloud 130 is limited to a single organization. In other examples, cloud 130 is available to many organizations. In an example, cloud 130 includes a multi-layer communications network comprising multiple edge routers and core routers. In another example, cloud 130 is based on a local collection of switches in a single physical location.

Database 140 is an organized collection of data, where for example, database 140 can store data in a specified format known as a schema. Database 140 may be structured as a single database, a distributed database, multiple distributed databases, or an emergency backup database. In some cases, a database controller may manage data storage and processing in database 140. In some cases, a user 105 interacts with the database controller. In other cases, a database controller may operate automatically without user interaction.

Figure 2:
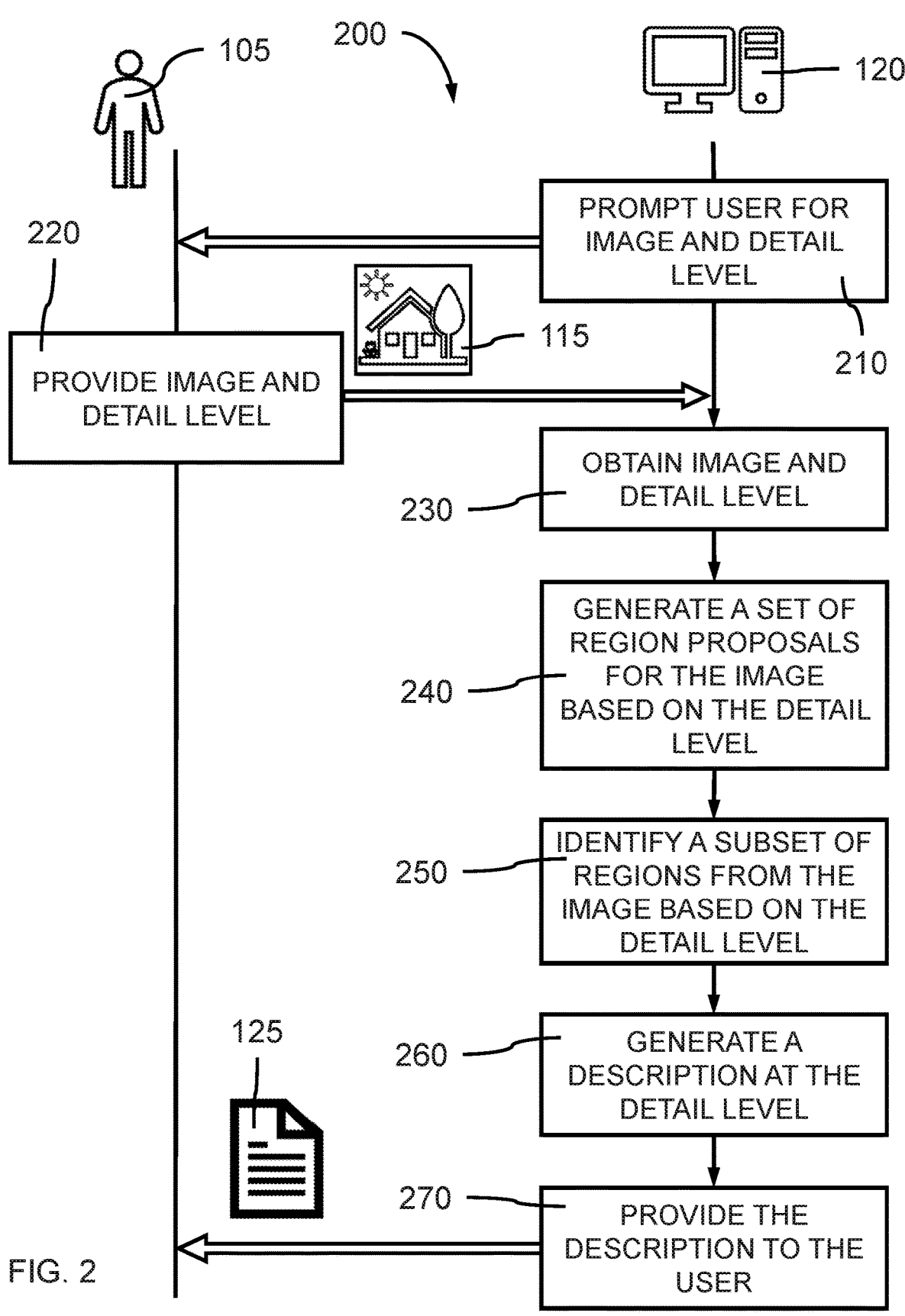
FIG. 2 shows a flow diagram illustrating an example of a description generation method applied to an image and description level, according to aspects of the present disclosure.

FIG. 2 shows a flow diagram illustrating an example of a description generation method applied to an image and description level, according to aspects of the present disclosure.

Images can contain an immense amount of information in the form of visual scenes. Descriptions of the images that can convey information about the particular scene in an image can be provided to readers/consumers. An image description compressed into a single sentence, however, may describe visual content in only coarse detail. Different users may be interested in different visual aspects and details of an image, where generic captions may not be sufficient. By varying the level of detail in the provided descriptions based on a user request, different readers can personalize their content consumption experience. A description used in an image retrieval system, for example, may rely on a close connection between the visual contents of an image and the resulting description to provide the correct material in response to a user request.

In various embodiments, the description generation apparatus 120 can receive and analyze an image 115 provided by a user and a detail level value (e.g., 0 to 1, 1 to 4, 1 to 5, 1 to 10, etc.), and provide an automatically generated description 125 based on the image 115 and provided detail level value. A machine learning model can be trained and used to interpret the detail level and provide a text description 125 at the requested detail level, where the text description can include a plurality of sentences. The description generation apparatus 120 can generate novel sentences describing images in natural language. Each of the sentences of the text description 125 can have a different object identified in the image as the subject of the sentence, and the sentences can describe aspects of the object with different amounts of detail.

In various embodiments, at operation 210, a description generation apparatus 120 including a machine learning model can prompt a user 105 to provide an image 115 and a detail level, where a prompt can be a text communication to the user 105. The prompt can provide a user interface including an image input field and a detail level input field, wherein the image and detail level are obtained from a user using the user interface.

In various embodiments, at operation 220, the user can provide an image 115 and a detail level to a description generation apparatus 120, where the image 115 can be a digital image including pixels, and the detail level can be represented by a value within a range, for example, a range of 1 to 100, 1 to 10, or 1 to 5, although other ranges are also contemplated. According to some aspects, the detail level can be normalized. The detail level can be a real number or an integer.

In various embodiments, at operation 230, the description generation apparatus 120 can receive the image 115 and detail level. The image 115 may be obtained from a set of images in memory of the description generation apparatus 120, where the user 105 identifies the image 115.

In various embodiments, at operation 240, the description generation apparatus 120 can generate a set of region proposals for the image 115 based on the detail level, where the set of region proposals can be bounding boxes for objects identified in the image. An image region selector can select image feature(s) to include in a description conditioned on the detail level, where a pipeline-based approach can be used to select the image feature(s) to be included in the description for an indicated detail level. The pipeline can include an image encoder including an image region selection module to select the regions in an image that are to be included in the description for the given detail level.

In various embodiments, at operation 250, a description generation apparatus 120 can identify a subset of the regions selected from the image 115 to be described based on the detail level, where the number of regions in the subset can be determined by the detail level. The subset of the regions can be selected from the image 115 based on the importance of the objects in the regions to the description.

In various embodiments, at operation 260, a description generation apparatus 120 can generate a text description for each of the objects in the subset of regions, where the text descriptions can be generated using a natural language model. A sentence can be generated for each region in the subset, where the sentence describes the features in the region, and the sentences can be concatenated to form a descriptive paragraph, as a generated text description 125.

In various embodiments, at operation 270, a description generation apparatus 120 can provide the generated text description 125 to the user 105, where the generated text description 125 can be electronically communicated to the user device.

In various embodiments, the sentences of the generated text description 125 can provide descriptions having different levels of detail about different objects in the set of region proposals. An entire paragraph for describing an image 115 can be generated with multiple sentences, where the sentences can provide a detailed textual description, and where the paragraphs can tell detailed, unified stories for images.

In various embodiments, the generated descriptions are not a single sentence, and/or the generated descriptions do not have or fall within a particular or predetermined length range. In various embodiments, the detail level is not a length level or length range that determines a number of words or tokens in the generated description, or specifies a minimum number of words, a maximum number of words, or both. The length of a description in a number of words may not correspond to the amount of detail provided by the description, particularly where the description of a predetermined length fails to include primary and/or secondary objects of interest. For example, if a description only talks about background information, while being of length 10, but another description talks about the main object in the image and is of length 5, then the length 5 description would be more descriptive than the descriptive sentence of length 10.

In various embodiments, the different machine learning models can be trained in a supervised manner with labeled data, so the models can learn the association between the level of detail and what bounding boxes to choose for the specified detail level. The description generator model can be trained in a supervised manner with labeled data, so the generator model can learn to describe the bounding boxes in accordance with the detail level. For example, at a detail level of 5 (e.g., most detailed), the generator model could be expected to generate a description of, "A large, brown dog is walking on the sidewalk past a stop sign," in comparison to "A dog is walking on the sidewalk." Each sentence may not be generated with the same level of detail, where instead the model learns the description corresponding to the detail level value from the provided training data. The different modules can be trained in a supervised manner with labeled data, and the model can learn an association between a level of detail and what bounding boxes to choose for that detail level. Also, the description generator can be trained with labeled data, so the description generator has learned during training to explain the provided bounding boxes in accordance with the detail level. The description sentence(s) may not be generated with the same level of detail; the model can learn the sentence level of detail from the provided data.

In various embodiments, a graph-based metric (e.g., SPICE-G) can be used to compute the quality and alignment of generated descriptions for images as per their detail level.

Figure 3:
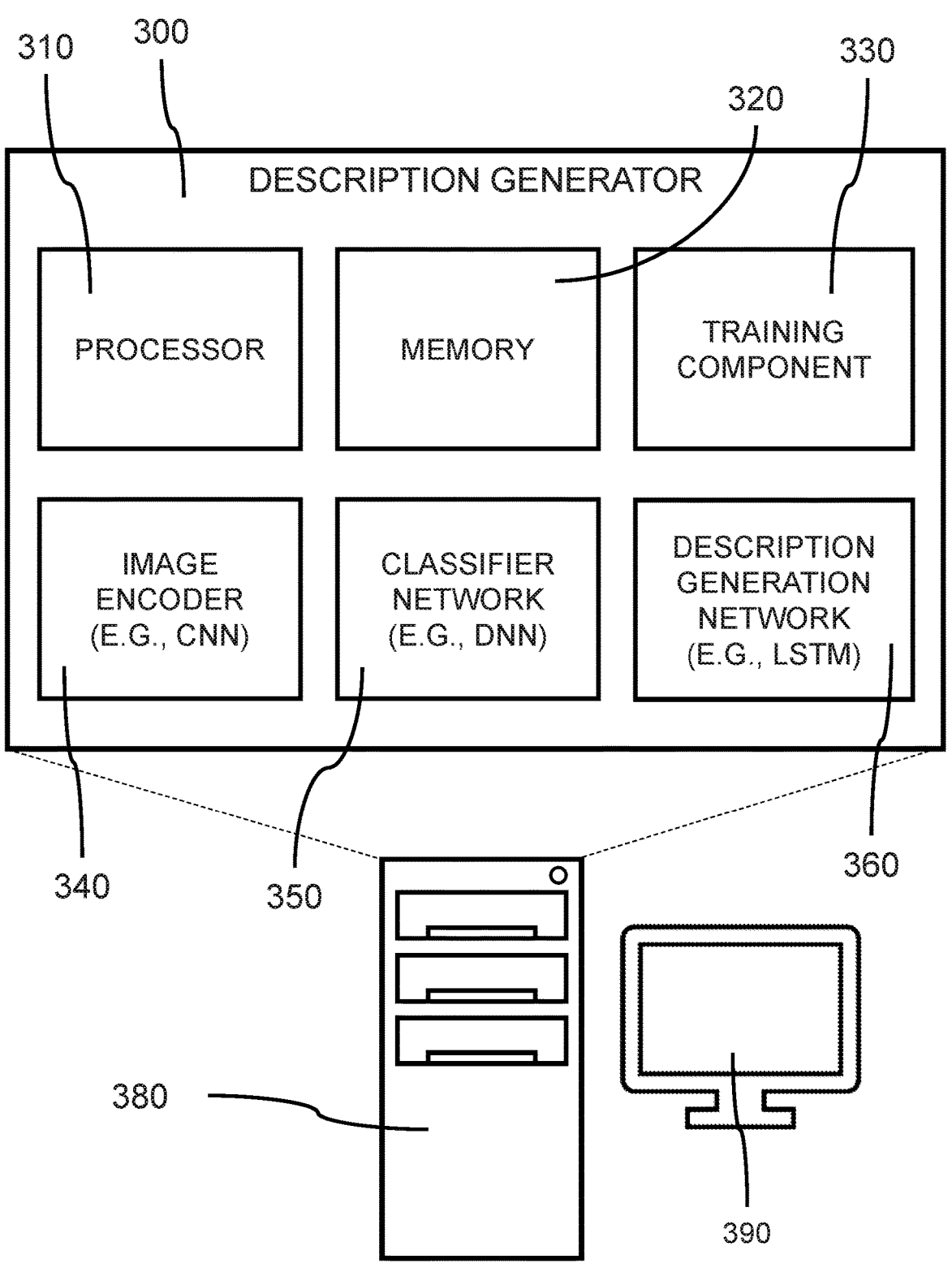
FIG. 3 a block diagram of an example of a description generator, according to aspects of the present disclosure.

FIG. 3 a block diagram of an example of a description generator, according to aspects of the present disclosure.

In one or more embodiments, a description generator 300 obtains original image(s) 115 including original content, and receives a detail level (e.g., a prompt) indicating a detail level of content to be included in a description for the image 115. The original image(s) 115 can be stored in computer memory 320. The original image(s) 115 can be identified by a user 105.

In various embodiments, a prompt from the description generator 300 includes a text statement presented to the user 105 on the display device 390 or communicated to a user's device 110.

In various embodiments, the description generator 300 can include a computer system 380 including one or more processors 310, computer memory 320, a training component 330, an image encoder 340, a classifier network 350, and a description generation network 360 (e.g., a natural language model). The computer system 380 of the description generator 300 can be operatively coupled to a display device 390 (e.g., computer screen, user device) for presenting prompts, descriptions, and images to a user 105, and operatively coupled to input devices to receive image and detail level input from the user. A region proposal network 410 can be incorporated into the image encoder 340. The classifier network 350 can include a multi-layer perceptron (MLP), where the classifier can include a feed forward network. The description generation network 360 can be a natural language processing (NLP) model, that can include an encoder and a decoder, as further described in reference to FIG. 4.

According to some aspects, processor unit 310 includes one or more processors. Processor unit 310 can be an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 310 is configured to operate a memory array using a memory controller. In other cases, a memory controller is integrated into the processor. In some cases, processor unit 310 is configured to execute computer-readable instructions stored in a memory to perform various functions. In some embodiments, processor unit 310 includes special-purpose components for modem processing, baseband processing, digital signal processing, or transmission processing. Processor unit 310 is an example of, or includes aspects of, the processor described with reference to FIG. 11.

According to some aspects, memory unit 320 comprise a memory coupled to and in communication with the one or more processors, where the memory includes instructions executable by the one or more processors to perform operations. Examples of memory unit 320 include random access memory (RAM), read-only memory (ROM), or a hard disk. Examples of memory unit 320 include solid-state memory and a hard disk drive. In some examples, memory unit 320 is used to store computer-readable, computer-executable software including instructions that, when executed, cause a processor to perform various functions described herein. In some cases, memory unit 320 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 320 store information in the form of a logical state. Memory unit 320 is an example of, or includes aspects of, the memory subsystem described with reference to FIG. 11.

In various embodiments, training component 330 can receive a training data set for the image encoder 340, region proposal network 410, classifier network 350, and description generation network 360, and apply a loss function to results obtained from the model being trained using the training data set. The training component 330 can update the model weights of the image encoder 340, region proposal network 410, classifier network 350, or description generation network 360 based on the results of the applied loss function. A single-stage training algorithm that jointly learns to classify object proposals and refine their spatial locations can be used.

In various embodiments, the image encoder 340 can identify context features and image features from the image 115, where the image features can be represented as a feature vector. The region proposal network 410 can identify a set of regions from the image 115 for generating the description. In various embodiments, a fast R-CNN network can generate a set of region proposals of image regions that may contain objects of interest.

In various embodiments, classifier network 350 selects a subset of the identified regions, where the subset includes all the objects that would be included in a text description of the image for a maximum detail level. It should be noted that detail level values do not have to correspond to a specific number of objects or length of a description. A detail level value of 1 could indicate a maximum detail level or a minimum detail level without particularly specifying the number of objects, sentences, or number of words in a generated description for an image.

In various embodiments, a detail level value of 1 can be considered a minimum in the case of a number of sentences version of the dataset (NumSent), whereas in a case of image normalized experiments, 0 is the minimum.

According to some aspects, description generation network 360 (e.g., LSTM, BERT, etc.) generates a description 125 including descriptions of identified object(s) from the original image 115, where the description 125 can be generated using a language model that takes a vector generated from the image encoder 340 and classifier network 350 as input. In some aspects, the output description 125 combines descriptive content for a plurality of objects in the image in a manner that provides a paragraph including multiple sentences.

In various embodiments, a description generator network 360 can generate a textual description for each of the selected region proposals, given the region proposal features, bounding boxes, and image context features. The description generator network 360 can include a language model 470 that can be an encoder model (e.g., BERT) or a Long-Short Term Memory (LSTM) network model.

Figure 4:
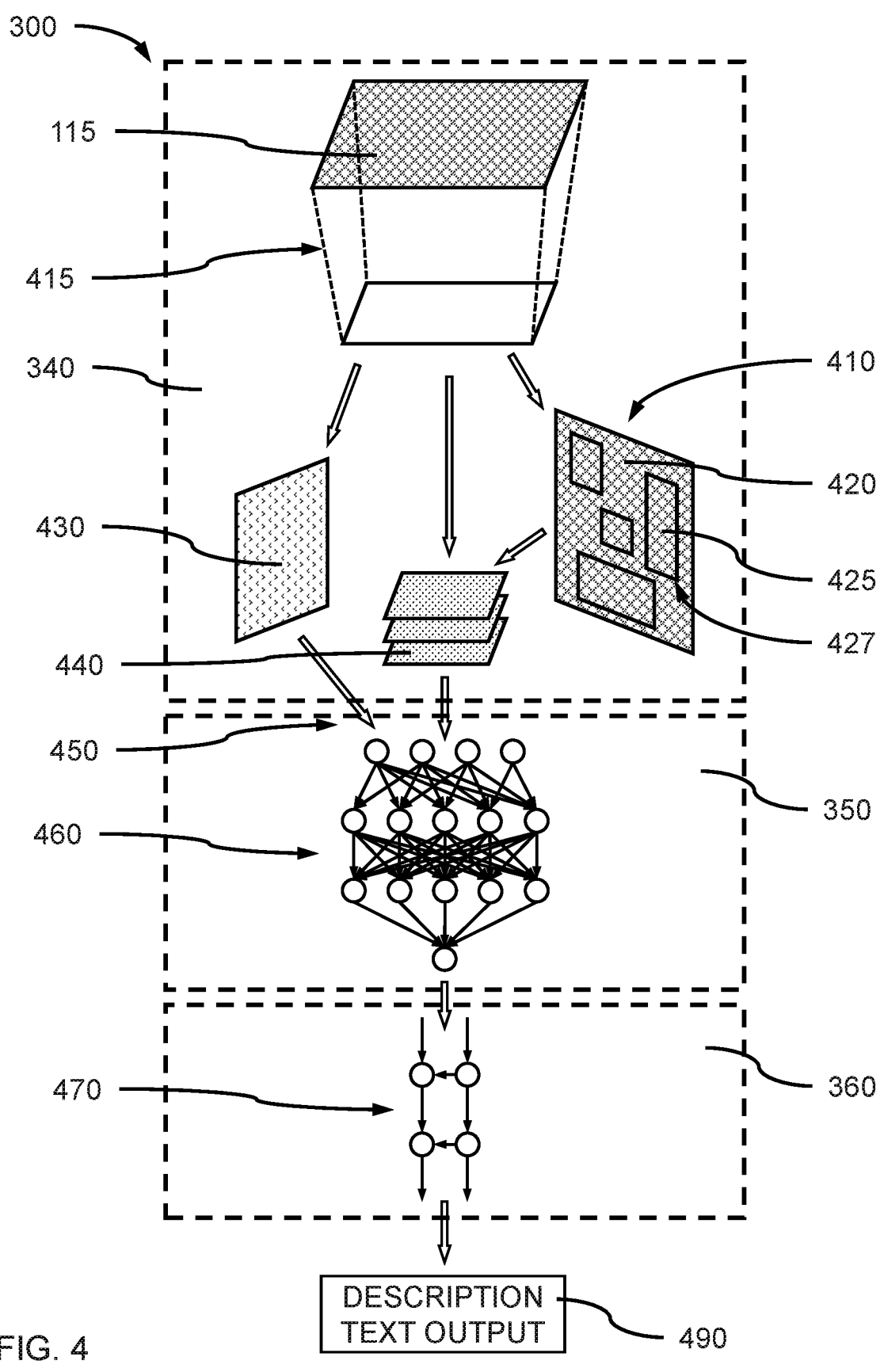
FIG. 4 shows a diagram of a description generator for receiving an image and outputting a text description, according to aspects of the present disclosure.

FIG. 4 shows a diagram of a description generator for receiving an image and outputting a text description, according to aspects of the present disclosure.

In various embodiments, a description generator 300 can include a pipeline with three (3) separately trained modules, including an image encoder 340 with a region proposal network 410, a classifier network 350, and a description generation network 360, such that a description 490 of an input image 115 can be generated.

In various embodiments, an image 115 can be fed into an image encoder 340, where the image encoder 340 can include a region proposal network 410. In various embodiments, a pre-trained object detector of the image encoder 340 can detect one or more objects in an image. The region proposal network 410 can identify one or more regions 425 of the image 115 that may contain identified objects of interest that can constitute a subject for inclusion in a description 490. A detail-level conditioned region selector can select a subset of regions out of all the region proposals generated by the region proposal network 410, given a certain level of detail. The Image encoder 340 can utilize both a ResNet-based encoder and a Faster R-CNN based region proposal network. A region proposal network 410 can be included in a Region Convolutional Neural Network (R-CNN). The region proposal network 410 can be the Faster R-CNN network used to create a set 420 of region proposals 425 identified by bounding boxes 427 of image regions that may contain objects of interest.

In various embodiments, a region proposal network 410 identifies a region of an image indicated by a bounding box 427, where the bounding box size and location can be determined based on an object to be contained within the bounding box 427. The region proposal network 410 can identify a region of the image 115 based on the object in the region, and ranked based on the attributes of the object, so as to focus the subject of a generated description on the object.

A Fast R-CNN network can take as input an image and a set of object proposals. The network can first process the whole image with several convolutional (conv) and max pooling layers to produce a conv feature map. Then, for each object proposal a region of interest (RoI) pooling layer extracts a fixed-length feature vector from the feature map. Each feature vector can be fed into a sequence of fully connected (fc) layers that branch into two sibling output layers, where one layer produces softmax probability estimates over K object classes plus a catch-all "background" class and another layer outputs four real-valued numbers for each of the K object classes. Each set of 4 values encodes refined bounding-box positions for one of the K classes.

In various embodiments, a detail-level conditioned region selector can select a subset of regions out of all the region proposals, given a certain level of detail. A detector score can be used to identify regions for the description.

In various embodiments, the image encoder 340 can include a convolutional neural network 415 having convolutional layers that can identify context features 430 and image features 440 from the image 115. A global Region-Of-Interest (ROI) pooling feature vector can be used as a context feature. The image features 440 can be represented as a feature vector, where the feature vector encodes the features detected within a bounding box. The features of each bounding box can be appended with the 4 position co-ordinates of the bounding box. The context features 430 can be represented as a vector for the whole image, where the context vector encodes features of the entire image. The feature vectors and context vectors can be generated by image encoder 340. A feature map is the output of a convolutional layer representing specific features in the input image. The number of filters in each layer can be the same depending on the size of the output feature map. Fixed-length image feature vectors can be generated for image features 440 from each region proposal 425 using Region-Of-Interest (ROI) pooling layers, as part of the Faster RCNN network. At each point of the convolutional feature map, the RPN can attach 9 anchors and for each anchor, it can predict a proposal. Non-maximum suppression can be carried out on the predicted proposals to get the final proposals based on the class confidence.

In various embodiments, ResNet-50 can be utilized as a backbone for the convolutional layers of the image encoder 340, and a convolutional neural network (CNN) can be utilized for obtaining image features 440. A ResNet-50 based network can be used to encode the whole image as context features 430. VGG16 is a type of CNN that uses small (3×3) convolution filters, and has a depth to 16-19 weight layers. The VGG16 can perform object detection and image classification. Region proposals can be used as an input to the classifier network 350.

In various embodiments, Faster R-CNN can be utilized as the region proposal network 410. The region proposal network can be utilized to predict the final bounding box offsets. A faster-RCNN based region proposal network (RPN) can then use the context features to identify the set of region proposals 425 represented by bounding boxes 427, and output the region features. The region proposal network 410 can utilize convolutional feature map(s) generated from an image 115, where the region proposal network can output region proposals with a class confidence. RPN 410 can work on the convolutional feature map generated by giving the image 115 as input to a VGG16 neural network. Two (2) classes can be object and background. The RPN can operate on the convolutional feature map. The RPN 410 can have 3 convolutional layers, where the intermediate layer can convert the convolutional feature map to a map used for region proposal generation. After padding, 512 convolutional kernels of size 3*3*512 can be used for the intermediate layer. A Regression layer can perform convolution using convolutional kernels. The regression layer can perform convolution using 36 (9*4) convolutional kernels each of size 1*1*512. A classification layer can predict the object/background probabilities for the region proposals 425. The classification layer can perform convolution using 18 (9*2) convolutional kernels each having a size of 1*1*512. The region features for the corresponding region proposals (selected by RPN) can be obtained using the convolutional feature map.

In various embodiments, the region proposal network (RPN) 410 may generate a large number of region proposals which might be overlapping. To reduce the number of overlapping proposals non-maximum suppression (NMS) filtering can be done with IoU (Intersection over Union) ratio of 0.7. The RPN network can also provide confidence score for each of the predicted proposals. So, for example, 300 bounding boxes/region proposals with the highest predicted confidence after NMS filtering with IoU ratio 0.7 can be generated and then a second round of NMS filtering can be done with ratio of 0.3.

In various embodiments, the region proposal network 410 can be pre-trained. A single-stage training algorithm that jointly learns to classify object proposals and refine their spatial locations can be used.

In various embodiments, the output of the region proposal network 410 can be a set 420 of all bounding boxes 427 that contain objects or areas that could be described in a text description at a maximum level of detail. The bounding box vector can be combined with the image feature vector for the corresponding region. Bounding boxes can be represented in the form of a vector comprising the region features and the coordinates of the bounding box.

In various embodiments, the fixed-length feature vectors for each region proposal are generated using Region-Of-Interest (ROI) pooling layers.

In various embodiments, the set of all bounding boxes can be provided to a classifier network 350, where the classifier network 350 can be trained to select a subset of region proposals from the set 420 of all the region proposals 425, where the subset can be in the form of bounding boxes. The classifier network 350 can take as input 450 an encoding of the region 425 inside every bounding box 427 without the encoding of the entire image (i.e., context vector), and predict if the bounding box should be chosen for the given level of detail. The region proposal and region image features 440 may be included as input 450. The set 420 of all bounding boxes indicating the regions 425 can be implicitly ranked and filtered based on training to identify primary, secondary, tertiary, etc. objects for description. Region selection can be based on, for example, object size, position (e.g., whether the object is in the center or on a periphery of the image), distance from a viewer (e.g., whether the object is in the foreground or background of the image), and image context.

In various embodiments, the classifier network 350 can output a value of zero (0) or one (1) for each bounding box in the set of all bounding boxes, where a value of 1 can indicate that the bounding box should be included in the subset and a value of 0 can indicate the bounding box should be excluded.

In various embodiments, the classifier network 350 can be a multi-layer perceptron 460, where the multi-layer perceptron can include three (3) hidden layers and an output layer of size 1. The multi-layer perceptron 460 can be trained to classify regions as included or excluded for generating a description.

In various embodiments, a description generation network 360 can receive the subset of bounding boxes selected by the classifier network 350 and generate a text description for each bounding box in the subset. The bounding boxes in the subset can be selected based on the detail level value, where the number of bounding boxes in the subset can correspond to the detail level.

In various embodiments, the description generation network 360 can be a Long-Short Term Memory (LSTM) network model that can generate each token in the description. The tokens in the description can be generated one at time by selecting the most likely next token given the previously generated tokens and the region image features 440.

In various embodiments, a Convolutional Neural Network (CNN) followed by a Recurrent Neural Network (RNN) language model can generate a text description.

In a non-limiting exemplary embodiment, region features of every bounding box, which is a vector of length 2048 can be appended with the 4 position co-ordinates of every bounding box; producing a vector of total length 2052. A context encoding vector for the whole image can have a dimension of 2048. A single detail level can map to a vector embedding of length 4100. This vector can be added to the concatenated region vector of length 2052, and context vector of length 2048. In various embodiments, the tokens and hidden layers have size of 512.

In various embodiments, the generated descriptions can be cleaned by removing the sentences which are very similar to other sentences in the description based on a comparison. A similarity score can be calculated based on a cosine similarity between the sentence embeddings of the descriptions. Sentence embeddings can be obtained, for example, using a sentence_transformers library, which works on the BERT model.

In various embodiments, the NLP can be a transformer type natural language processor/neural language model (e.g., GPT), an encoder based natural language processor (e.g., Bidirectional Encoder Representations from Transformers (BERT), Robustly Optimized BERT (ROBERTa)), or other encoder/decoder based NLP.

A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes attention mechanism, where the attention looks at an input sequence and decides at each step which other parts of the sequence are important.

The attention mechanism involves query, keys, and values denoted by Q, K, and V, respectively. Q is a matrix that contains the query (vector representation of one word in the sequence), K represents all the keys (vector representations of all the words in the sequence), and V is the values, which is the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights, a.

FIG. 5 shows a diagram illustrating an example of a method of generating a text description at a level of detail for an image, according to aspects of the present disclosure.

The task of image captioning involves generating a general-purpose caption (or "description") for a given image.

At operation 510, an image and a detail level can be obtained by an image generator, where the image can be obtained, for example, from a user or a database, and the detail level can be a value obtained from the user.

At operation 520, regions within the image can be identified, where the regions may be identified based on the detail level. A higher detail level can indicate that more regions and objects are selected from the image, whereas a lower detail level can indicate that fewer regions and objects are selected from the image.

At operation 523, a set of region proposals can be created, where the set can include bounding boxes indicating regions containing each object identified in the image. The region proposals can be represented as vectors that denote the features of the bounding box region determined using the encoder concatenated with the coordinates of the bounding box. For example, the features can each be represented by a vector of size 2048+4 (coordinates for location of the bounding box with respect to the whole image)=2052.

At operation 527, a subset of the set of region proposals can be identified based on criteria applied to the objects and determined based on the detail level. The set of region proposals can be identified based on attributes of the objects contained within the bounding boxes, where larger objects closer to the center of the image and nearer to a viewer can be ranked higher, and objects that are smaller and located at the periphery of the image or farther from a viewer can be ranked lower. The number of regions proposals included in the subset can be determined by the requested detail level, where a classifier network of the description generator has been trained to identify a number of regions for description from the set of region proposals based on the detail level.

At operation 530, a textual description having the predetermined detail level can be generated for the subset of region proposals. The textual description can be generated by a decoder using the encodings for the regions and image features.

At operation 535, a sentence can be generated for each region in the selected subset, where the sentence can describe the object and object attributes in the particular region. Multiple sentences generated for the selected regions in the subset can be concatenated to form a descriptive paragraph.

At operation 540, a detail score can be calculated based on the textual descriptions and the selected regions. The detail score can be computed for the description based on the POS tags of the words and the uniqueness of the words in the description.

"In various embodiments, the scoring function can compute a score for each word in a sentence of a description and take a weighted average of the word-level scores to obtain a final score for the sentence. The scoring function for a description, d, of an image, i, can be:

$$S(i, d) = \sum_j^{|d|} \left(w_1 * s_1^j\right) + \left(w_2 * s_2^j\right);$$

where $$s_1^j$$

and $$s_2^j$$

are the frequency-based and part-of-speech (POS) tag-based scores for the $j^{th}$ word in the description respectively, and $w_1$ and $w_2$ correspond to weights for $$s_1^j$$

and $$s_2^j.$$

Score $s_1$ is related to the inverse frequency of a word as per the English word frequency dataset which contains 0.33 million most frequent words on the web. If a word is more frequent, then a lower score is assigned to that word. Score $s_2$ is related to the POS tag of that word. The score for a given POS tag is determined based on the position of that tag in the order it occurs in the dependency tree for that sentence.

Verbs are scored the highest (e.g., 10), and subsequently each POS tag gets a lower score decreasing by one point in the above order (e.g., proper noun—9, noun—8, and so on where the order is [verb, proper noun, noun, adverb, adjective, numeral, pronoun, other (e.g., article)]). Sum of the scores for each word in a sentence gives the total score of the sentence. The weight scores can be empirically chosen as $w_1=0.1$, and $w_2=0.9$.

At operation 545, the verb, nouns, adjectives, and other parts of speech can be counted to determine the detail score for the full image. Different descriptions can be scored using a count-based detail scoring function, which considers the number of verbs, nouns, adjectives mentioned in a description.

Embodiments of the disclosure can utilize an artificial neural network (ANN), which is a hardware and/or a software component that includes a number of connected nodes (i.e., artificial neurons), which loosely correspond to the neurons in a human brain. Each connection, or edge, transmits a signal from one node to another (like the physical synapses in a brain). When a node receives a signal, the nodes processes the signal and then transmits the processed signal to other connected nodes. In some cases, the signals between nodes comprise real numbers, and the output of each node is computed by a function of the sum of the node's inputs. In some examples, nodes may determine their output using other mathematical algorithms (e.g., selecting the max from the inputs as the output) or other suitable algorithms for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the layer's inputs. The initial layer is known as the input layer and the last layer is known as the output layer. In some cases, signals traverse certain layers multiple times.

FIG. 6 shows a diagram of an example of a method of training a description generator, according to aspects of the present disclosure.

In various embodiments, a training component can train a convolutional neural network of the machine learning model to generate a set of region proposals that contain objects or areas to be described in a caption at a maximum detail level.

In various embodiments, a training component can train a binary classifier using a labelled data set with ground truths for bounding boxes that are to be described can be utilized for a given level of detail with respect to an image.

In various embodiments, the Visual genome data set can be used for training, where the Visual genome data set includes bounding box annotations for ground truths and descriptions for each bounding box for an image. Labelled pairs (image, bounding-box, detail level, I/O (choose/do not choose)) can be used to train the classifier using a detail-level data set, where the detail-level data set includes descriptions at multiple detail levels for each image.

In various embodiments, a training component can train a description generation network using a labelled data set with ground truth descriptions associated with selected image regions.

Each image can be annotated with a paragraph description, that goes beyond the presence of a few salient objects and includes information about each object's properties (e.g., attributes) and relationships. At a lowest level of detail, an overall description that can include a main object or action of image, whereas a highest level of detail can include minute details about objects and/or background information. Each detail level can subsequently contain information about more minute or background objects in addition to the information of the previous level.

At operation 610, a training data set can be constructed from a set of images, where the Stanford Paragraph Captioning Dataset, which includes of 19,551 MS-COCO and Visual Genome images can be annotated. Each image in the data set can be annotated with a paragraph description, where the paragraph description includes a plurality of sentences. Each of the sentences can describe a region of the image, where the region can include an object (e.g., person, car, river, building, cloud, sun, tree, etc.), an action (e.g., singing, dancing, sleeping, racing, flowing, setting, etc.), or an attribute (e.g., red hat, happy children, dark cloud, old building, etc.).

Embodiments can relate to a method of constructing a new detail-labelled image description data set by automatically obtaining detail scores for an existing image description data set and annotating the data set. A detail level can be in terms of different actions, objects, and the attributes of the objects present in the image. The detail scores can be automatically obtained for an existing image description dataset, that can result in a new detail-labelled image description dataset. The detail scores can be obtained for a given image-description pair. A reference-free evaluation metric can be used to measure the level of detail in a given textual description for an image without reference descriptions, where the metric can measure the quality and alignment of the descriptions with respect to the corresponding images, without the need of any reference descriptions. Each description obtained for an image can be scored using a scoring function to quantify the amount of detail that it captures in the image.

Embodiments can relate to a data set, where the dataset can have one paragraph description for each image in the data set. For each image, the paragraph description can be first split into sentences in the order in which they appear.

The first sentence in each paragraph description covers the most important activity or object(s) in the associated image. Successive sentences in the descriptive paragraphs can add more details to the main action(s) or object(s), and/or about other objects and the background. For each given image, the sentences in its paragraph description can be combined cumulatively, to obtain descriptions of different levels of detail.

The paragraph can include an overall description which contains the main object or action within the image, and additional sentences that add more objects, smaller details, or information regarding the image background. Image features that are to be included in a description for a given detail level can be identified.

At operation 620, the training data set and a detail level can be input to a description generation apparatus, where a description generator of the description generation apparatus can receive the training data set and the detail level.

At operation 630, regions within the input image can be identified, where the regions can be identified based on an object and the attributes of the object.

At operation 633, a set of proposal regions can be generated be identifying a region for each object in the image and grouping the regions in the set. The objects can be identified using object recognition, for example, utilizing a convolutional neural network.

At operation 637, a bounding box can be calculated for each region. Each of the regions can be specified by a bounding box that surrounds the object in the region. The set of proposal regions can be formed as a set of vector representations of the bounding boxes for the identified regions.

At operation 640, a subset of the regions can be identified, where the subset can include the regions containing the most salient objects for describing the image. The regions can be selected by the classifier based on the given detail level and the image context features. The classifier can determine the association between the detail level and the regions, where the model can be trained to identify objects and regions using supervised training. The regions can be selected by scoring the objects identified in the image based on the specified detail level and the image content features.

At operation 650, a description can be generated for each of the regions in the subset, where the number of regions and amount of features included in the description is based on the provided detail level. The description can be generated by a description generation network (e.g., BERT).

At operation 660, the selected subset of regions can be compared to a ground truth set of selected regions. A description generated by the description generation network for the subset of regions can be compared to a ground truth set of descriptions.

At operation 665, a loss function can be used to calculate a loss value for the difference between the selected subset of regions and the ground truth set of selected regions. A loss function can be used to calculate a loss value for the difference between the generated description and the ground truth description for each of the selected regions. The loss values can be used to update the classifier network and the description generation network, respectively.

Figure 7:
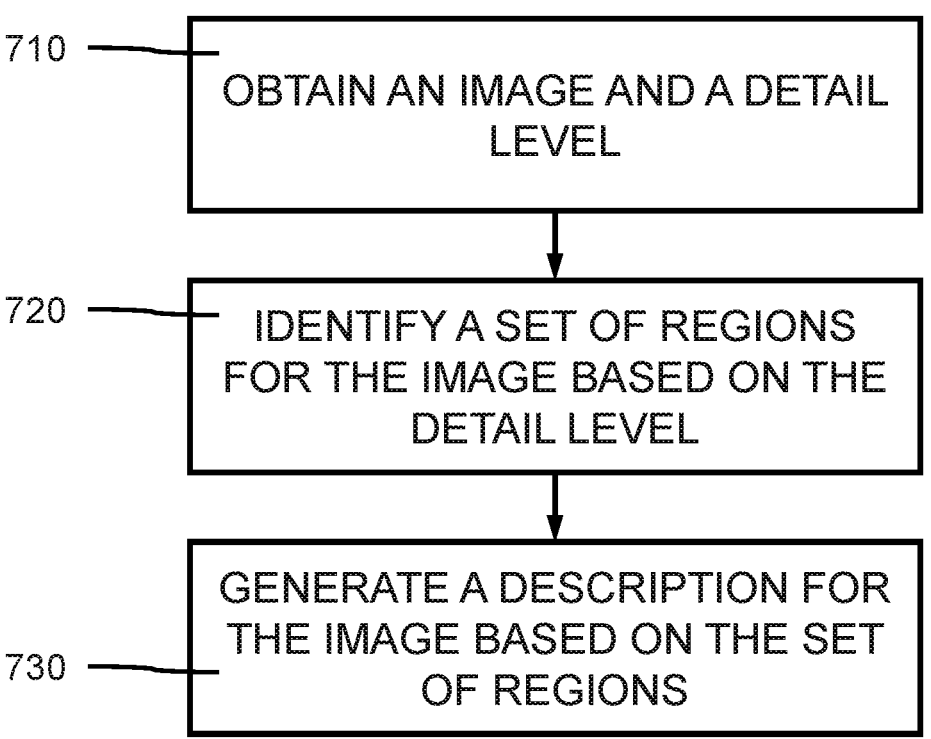
FIG. 7 shows a diagram of an example of a method of generating a text description for an image, according to aspects of the present disclosure.

FIG. 7 shows a diagram of an example of a method of generating a text description for an image, according to aspects of the present disclosure.

At operation 710, an image and a detail level can be obtained, wherein the image and detail level can be obtained from a user using a user interface. The image 115 may be obtained in response to a prompt from a machine learning model to a user 105 to provide the image 115. The image 115 may be stored in and obtained from a memory 320 of the description generator 300 or a database 140.

At operation 720, a set of regions can be identified for the image based on the detail level. The set of regions may contain objects of interest in an image to be included in a caption. A description generation apparatus 120 can generate a text description for each of the objects in a subset of the regions.

At operation 730, a description can be generated for the image based on the set of regions. The description may be generated for the one or more objects in identified regions using a language model, for example, a Bidirectional Encoder Representations from Transformers (BERT) model or Long-Short Term Memory (LSTM) network. A textual description having the predetermined detail level can be generated for the subset of region proposals, where the textual description can be generated based on the detail level by a decoder using the encodings for the regions and image features.

Figure 8:
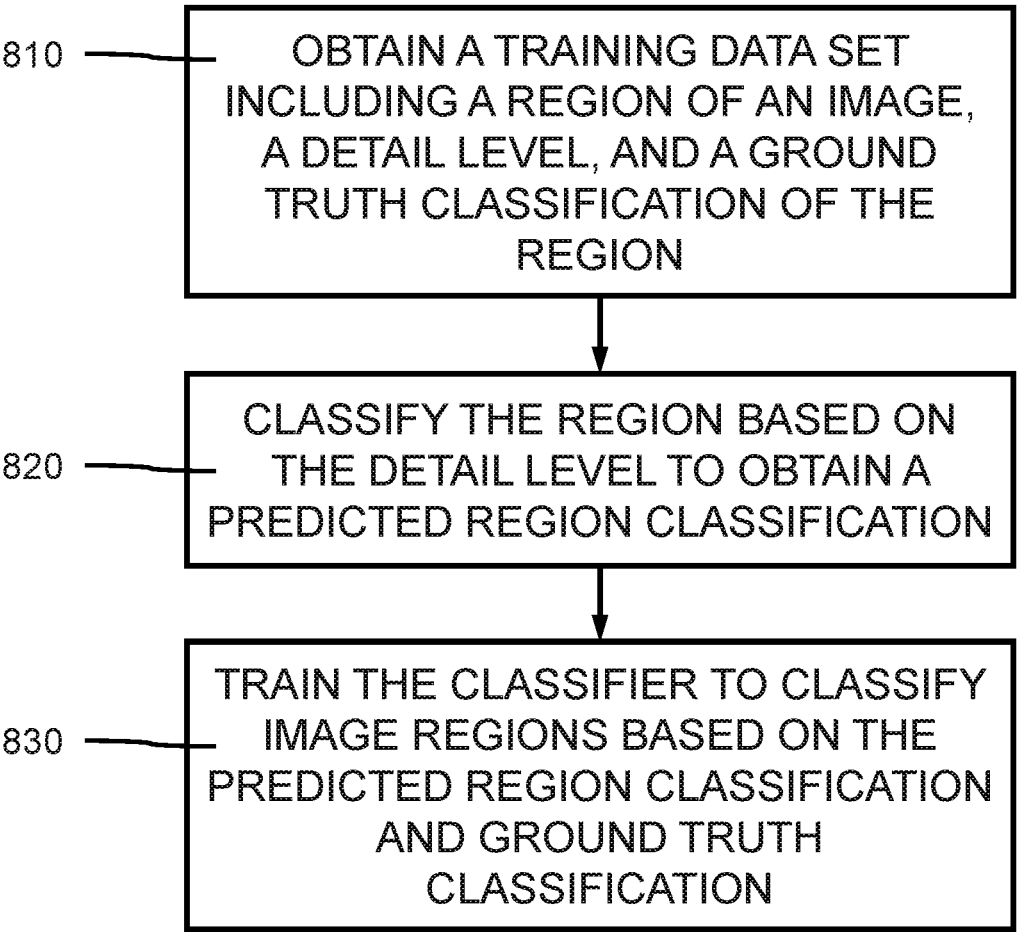
FIG. 8 shows a diagram of an example of a method of training a classifier of an image generator model, according to aspects of the present disclosure.

FIG. 8 shows a diagram of an example of a method of training a classifier of an image generator model, according to aspects of the present disclosure.

At operation 810, a training data set can be obtained, where the training data set can include an image, an identified region of the image, a detail level, and a ground truth classification of the region. The ground truth classification of the region can specify that the region is included or excluded. The training data set can include a description paragraph having multiple sentences as ground truth descriptions of image features associated with the identified region of the image and detail level.

At operation 820, the region can be classified based on the detail level to obtain a predicted region classification. A classifier network can classify a region based on the detail level, where the classification can select a subset of the region proposals, where the subset includes the objects that would be included in a text description of the image for a maximum detail level.

At operation 830, the classifier network can be trained to classify the image regions based on the predicted region classification and the ground truth region classification. Training can update the classifier network to predict the regions proposals including the object for description in the subset. The weights of the classifier network can be updated based on a loss function, where the loss function can be used to calculate a loss value for the difference between the predicted region classification and the ground truth classification for each of the region proposals.

Figure 9:
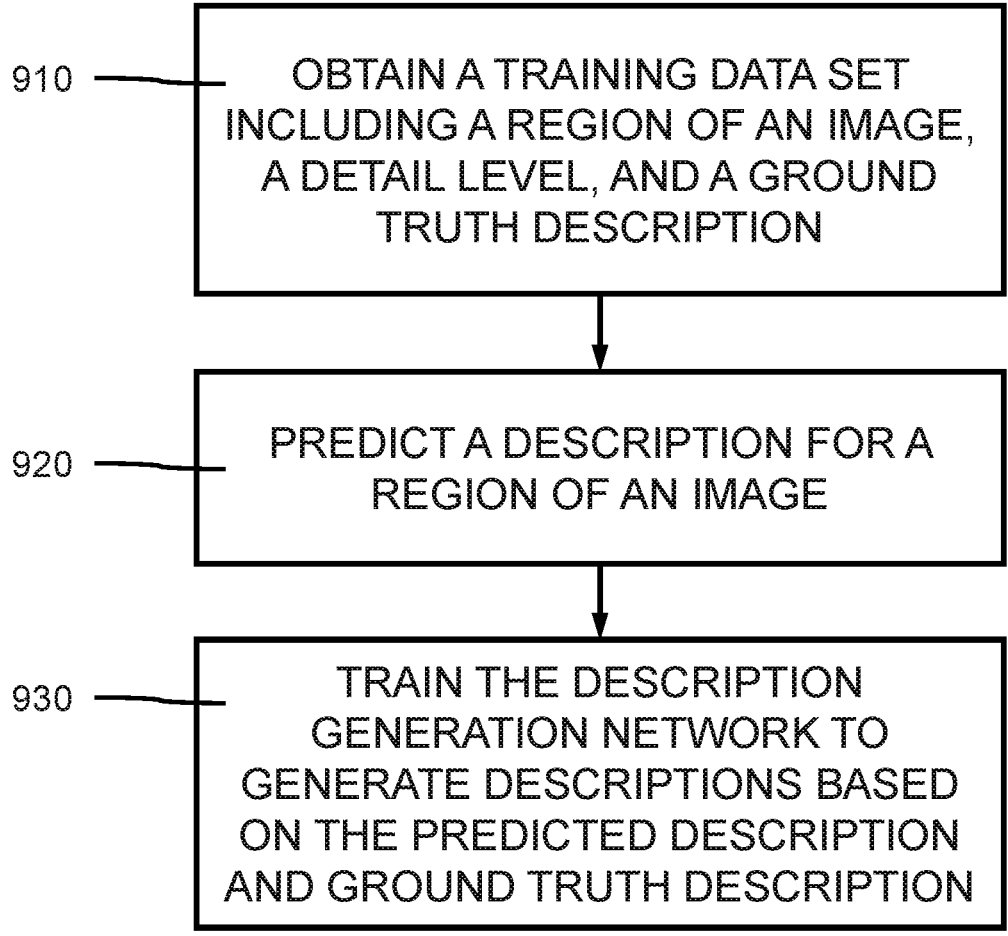
FIG. 9 shows a diagram of an example of a method of training a description generation network, according to aspects of the present disclosure.

FIG. 9 shows a diagram of an example of a method of training a description generation network, according to aspects of the present disclosure.

At operation 910, a training data set can be obtained, where the training data set can include an image, an identified region of the image, a detail level, and a ground truth description of the region. The ground truth description of the region can be a text sequence that describes the region. The description paragraph can have multiple sentences as ground truth descriptions of image features, where each sentence can be associated with an object in the image.

At operation 920, a predicted description can be generated for the region of the image in the training data set. The predicted description can include a sentence for each object, and the number of described objects and sentences can be based on the detail level.

At operation 930, the description generation network can be trained to generate descriptions based on the predicted description and the ground truth description. The predicted description can be compared to the ground truth description paragraph for the associated detail level. A loss function can be used to calculate a loss value for the difference between the generated predicted description and the ground truth description at the predetermined detail level.

Figure 10:
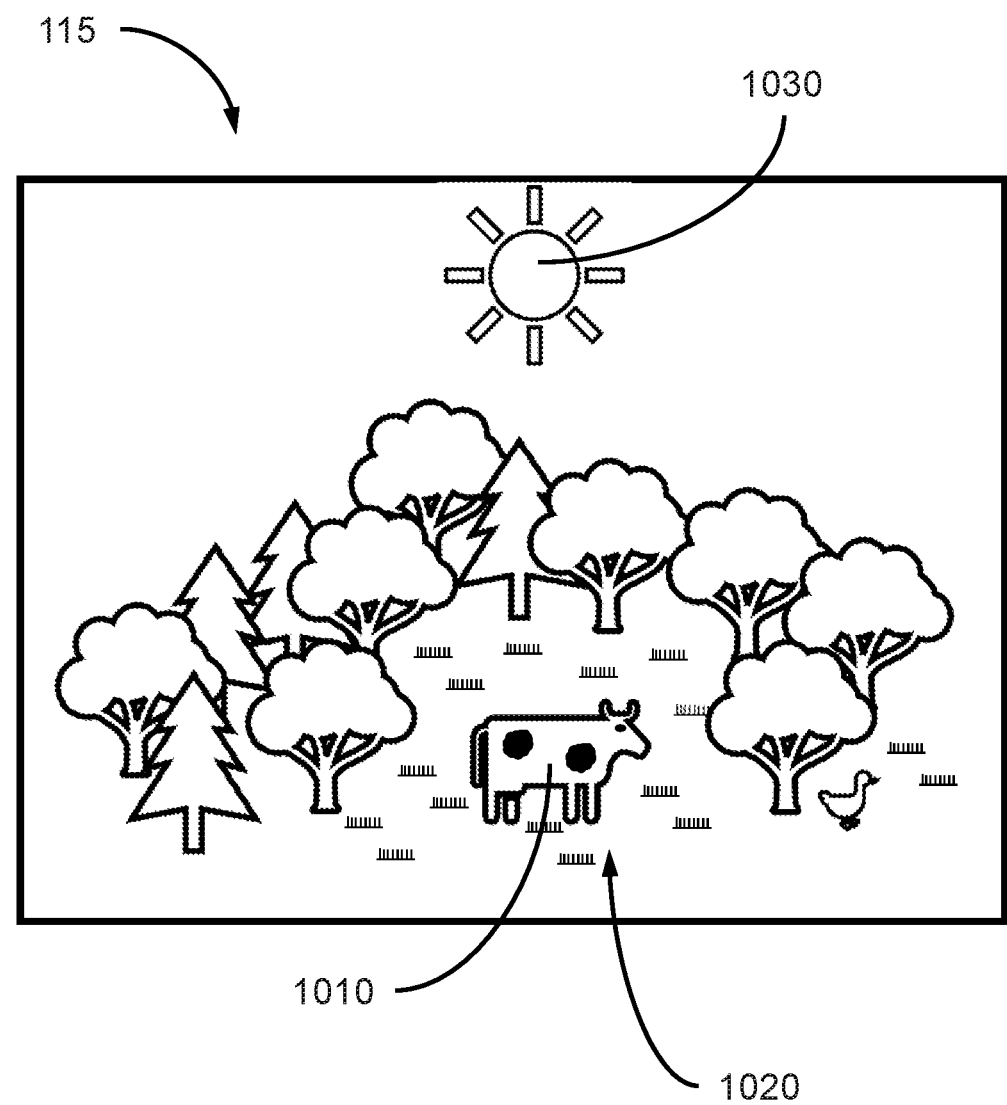
FIG. 10 shows an example of an input image for description generation at different detail levels, according to aspects of the present disclosure.

FIG. 10 shows an example of an input image for description generation at different detail levels, according to aspects of the present disclosure.

Embodiments relate to a method of generating image descriptions with varying levels of detail, that can go from a low-level detail description that presents an overall idea or context of the image and/or the most prominent action(s) or entities in the image, to a high-level detail description in which the description can incorporate additionally minute details and address all or a majority of the objects present in the image along with their attributes.

In various embodiments, the scene depicted in FIG. 10 may be described at a low level (e.g., level 1) of detail as, "A cow is grazing in a field.", where the image includes a cow 1010 in a field 1020. A next level of detail (e.g., level 2) may describe, "A cow is grazing in a field. The field is surrounded by trees." The next level of detail (e.g., level 3) may describe, "A cow is grazing in a field. The field is surrounded by trees. It is a sunny day.", where the sun 1030 can be seen. The next level of detail (e.g., level 4) may describe, "A cow is grazing in a field. The field is surrounded by trees. It is a sunny day. A duck is standing in the shade of a tree." The next level of detail (e.g., level 5) may describe, "A cow is grazing in a field. The field is surrounded by trees. It is a sunny day. A duck is standing in the shade of a tree. The tress are pine trees and oak trees."

In various embodiments, each higher level of detail, indicated by a higher detail level value, can incorporate descriptions for additional objects in the scene, descriptions of additional details for objects already described in the scene, or both. The details can include objects, object attributes, and object actions, which may be included in a scene graph. Each detail level can correspond to the number of sentences in the description for each image. As the number of sentences in a paragraph description for an image varies, levels 1-4 can contain descriptions with the number of sentences equal to the level, and level 5 can contain all the sentences (>=5) for paragraph descriptions with the number of sentences>=5.

Each description, thus obtained for an image, is scored using a scoring function to quantify the amount of detail that it captures in the image. The scoring function can address whether the caption describes the main entity, action, or object of the image or auxiliary objects, whether the object described is in foreground or background of the image, and a level of abstraction regarding the extent that the description relates to an overall object/action or includes specific details. Higher scores can be given to foreground entities and salient objects in the image than to small or background objects. Increasing the length of a description doesn't necessarily result in an increase in score.

In various embodiments, the scoring function can compute a score for each word in a sentence included in the description, and take a weighted average of the word-level scores to obtain a final score. The scoring function for a description d of an image, I, can be:

$$S(i, d) = \sum_{j}^{|d|} \left( w_1 * s_1^j \right) + \left( w_2 * s_2^j \right);$$

where $$s_1^j$$

and $$s_2^j$$

are the frequency-based and part-of-speech (POS) tag-based scores for the $j^{th}$ word in the description respectively, and $w_1$ and $w_2$ correspond to weights for $$s_1^j$$

and $$s_2^j.$$

Score $s_1$ is related to the inverse frequency of a word as per the English word frequency dataset which contains 0.33 million most frequent words on the web. If a word is more frequent, then a lower score is assigned to that word. Score $s_2$ is related to the POS tag of that word. The score for a given POS tag is determined based on the position of that tag in the order it occurs in the dependency tree for that sentence.

Verbs are scored the highest (e.g., 10), and subsequently each POS tag gets a lower score decreasing by one point in the above order (e.g., proper noun—9, noun—8, and so on where the order is [verb, proper noun, noun, adverb, adjective, numeral, pronoun, other (e.g., article)]). Sum of the scores for each word in a sentence gives the total score of the sentence. The weight scores can be empirically chosen as $w_1$=0.1, and $w_2$=0.9.

Naturally occurring images or scenes can vary greatly in the amount of informative content present in them. Thus, they may not be scored on a single absolute scale. Therefore, the scores of descriptions for each image can be normalized based on the total information the image contains. Three versions of the dataset may be created based on different ways of binning the descriptions for different detail levels (e.g., 5 levels). The scores of various descriptions for an image, as described below, can be normalized to capture the amount of information contained with respect to the image, where: $S_{norm}(i,d) = S(i,d)/S(i,d_{max})$, where $d_{max}$ denotes the description covering maximal information for that image. With this score the binning for 5 levels can be done as: [0, 0.28)–Level 1, [0.28, 0.48)–Level 2, [0.48, 0.69)–Level 3, [0.69, 0.9)–Level 4, [0.9, 1]–Level 5.

In various embodiments, the detail level value can be a real number, that can provide greater flexibility and range, rather than an integer. The real number can be normalized to a value of 0 to 1, rather than being an integer level (e.g., 1, 2, 3, 4, 5). The normalized scores can capture continuous detail for an amount of information with respect to an image.

Embodiments can utilize a word embedding model to encode a text prompt. A word embedding is a learned representation for text where words that have the same meaning have a similar representation. Glove, Word2Vec, GPT, BERT, and CLIP are examples of systems for obtaining a vector representation of words. GloVe is an unsupervised algorithm for training a network using aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the vector space. Word vectors are positioned in the vector space in a manner such that similar words are located nearby in the vector space. In some cases, an embedding space may include syntactic or context information in additional to semantic information for individual words.

Figure 11:
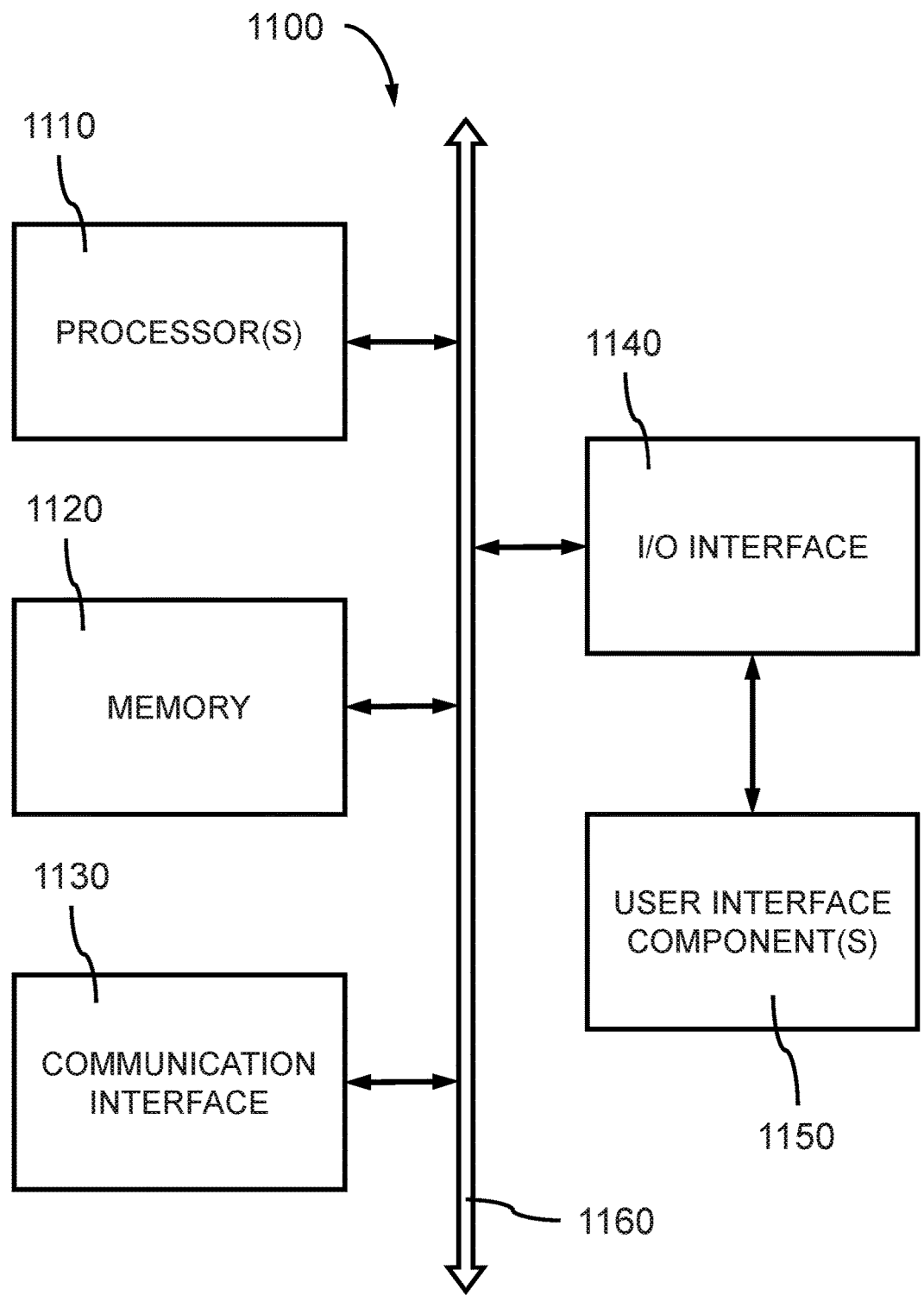
FIG. 11 shows an example of a computing device for a description generator, according to aspects of the present disclosure.

FIG. 11 shows an example of a computing device for a description generation apparatus 120, according to aspects of the present disclosure.

In various embodiments, the computing device 1100 includes processor(s) 1110, memory subsystem 1120, communication interface 1130, I/O interface 1140, user interface component(s) 1150, and channel 1060.

In various embodiments, computing device 1000 is an example of, or includes aspects of description generation apparatus 120. In some embodiments, computing device 1100 includes one or more processors 1110 that can execute instructions stored in memory subsystem 1120 for identifying regions of an image and generating a description of the image based on the regions.

In various embodiments, computing device 1100 includes one or more processors 1110. In various embodiments, a processor 1110 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1010 is configured to operate a memory array using a memory controller. In other cases, a memory controller is integrated into a processor. In some cases, a processor is configured to execute computer-readable instructions stored in a memory to perform various functions. In some embodiments, a processor 1110 includes special-purpose components for modem processing, baseband processing, digital signal processing, or transmission processing.

A processor 1110 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor 1110, the functions may be stored in the form of instructions or code on a computer-readable medium.

In various embodiments, memory subsystem 1120 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor 1110 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1130 operates at a boundary between communicating entities (such as computing device 1100, one or more user devices, a cloud, and one or more databases) and channel 1160 (e.g., bus), and can record and process communications. In some cases, communication interface 1130 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1140 is controlled by an I/O controller to manage input and output signals for computing device 1100. In some cases, I/O interface 1140 manages peripherals not integrated into computing device 1100. In some cases, I/O interface 1040 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

According to some aspects, user interface component(s) 1150 enable a user to interact with computing device 1100. In some cases, user interface component(s) 1150 include an audio device, such as an external speaker system, an external display device such as a display device 390 (e.g., screen), an input device (e.g., a remote-control device interfaced with a user interface directly or through the I/O controller), or a combination thereof. In some cases, user interface component(s) 1150 include a GUI.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an image and a detail level, wherein the detail level comprises a value indicating a level of detail for a description of the image;
identifying a set of region proposals, wherein each of the set of region proposals comprises a region of the image represented by a bounding box;
identifying a set of regions for the image based on the detail level using a machine learning model, wherein a number of bounding boxes associated with the set of regions corresponds to the detail level; and
generating the description for the image based on the set of regions, wherein an amount of detail in the description is based on the detail level.

2. The method of claim 1, further comprising:
generating the set of region proposals for the image using an encoder of the machine learning model.

3. The method of claim 2, further comprising:
generating context features of the image using the encoder, wherein the set of regions is identified based on the context features.

4. The method of claim 2, further comprising:
generating region features for at least one of the set of region proposals using the encoder, wherein the description is based on the region features.

5. The method of claim 2, further comprising:
generating a bounding box for at least one of the set of region proposals using the encoder, wherein the set of regions is selected from the set of region proposals based on the bounding box.

6. The method of claim 2, further comprising:
classifying each of the set of region proposals based on the detail level using a classifier of the machine learning model, wherein the set of regions is based on the classifying.

7. The method of claim 1, further comprising:
generating a region description for each of the set of regions using a generator of the machine learning model; and
combining the region description for each of the set of regions to obtain the description.

8. The method of claim 7, further comprising:
filtering the region description for each of the set of regions based on a sentence similarity score, wherein the combining is based on the filtering.

9. A method of training a machine learning model, comprising:
obtaining a training data set including a region of an image, a detail level, and a ground truth classification of the region, wherein the detail level comprises a value indicating a level of detail for a description of the image;
identifying a set of region proposals, wherein each of the set of region proposals comprises a region of the image represented by a bounding box;
identifying a set of regions for the image based on the detail level using the machine learning model, wherein a number of bounding boxes associated with the set of regions corresponds to the detail level;
classifying the region of the image based on the detail level and the set of regions using a classifier of the machine learning model to obtain a region classification; and
training the classifier to classify image regions based on the region classification and the ground truth classification.

10. The method of claim 9, further comprising:
computing a classification loss by comparing the ground truth classification and the region classification.

11. The method of claim 9, further comprising:
training an encoder of the machine learning model to generate the set of region proposals, wherein the region of the image is based on an output of the encoder.

12. The method of claim 9, further comprising:
training a generator of the machine learning model to generate a region description for the region of the image.

13. The method of claim 9, further comprising:
obtaining a ground truth description of the image corresponding to the detail level;
generating a region description of the region of the image; and
comparing the region description to the ground truth description of the image, wherein the region description is based on the comparison.

14. An apparatus comprising:
one or more processors;
one or more memories including instructions executable by the one or more processors; and
a machine learning model including parameters stored in the one or more memories, wherein the machine learning model is trained to;
obtaining an image and a detail level, wherein the detail level comprises a value indicating a level of detail for a description of the image;
identifying a set of region proposals, wherein each of the set of region proposals comprises a region of the image represented by a bounding box;
identify a set of regions for the image based on the detail level, wherein a number of bounding boxes associated with the set of regions corresponds to the detail level; and
generate the description for the image based on the set of regions, wherein an amount of detail in the description is based on the detail level.

15. The apparatus of claim 14, wherein:

the machine learning model comprises an encoder con-
figured to generate the set of region proposals, wherein
the set of regions is identified based on the set of region
proposals.

16. The apparatus of claim 15, wherein:

the encoder comprises a region proposal network (RPN).

17. The apparatus of claim 14, wherein:

the machine learning model comprises a classifier con-
figured to classify the set of regions of the image based
on the detail level, wherein the set of regions is
identified based on the classification.

18. The apparatus of claim 17, wherein:

the classifier comprises a feed forward network.

19. The apparatus of claim 14, wherein:

the machine learning model comprises a generator con-
figured to generate a region description for each of the
set of regions, wherein the description is based on the
region description.

20. The apparatus of claim 19, wherein:

the generator comprises a transformer model or Long-
Short Term Memory (LSTM) model.

\*  \*  \*  \*  \*